United States Patent [19]
Duval et al.

[11] 4,024,019
[45] May 17, 1977

[54] STEAM GENERATING PLANT

[75] Inventors: David Duval, Great Brookham; Edward Henry Taylor, Reading, both of England

[73] Assignee: Foster Wheeler Corporation, Livingston, N.J.

[22] Filed: July 17, 1974

[21] Appl. No.: 489,315

[30] Foreign Application Priority Data

July 17, 1973 United Kingdom ............. 34100/73

[52] U.S. Cl. .................................. 176/65; 176/61
[51] Int. Cl.² ........................................ G21C 19/28
[58] Field of Search ................... 176/60, 61, 65

[56] References Cited

UNITED STATES PATENTS

| | | | |
|---|---|---|---|
| 3,150,051 | 9/1964 | Ammon | 176/65 X |
| 3,442,760 | 5/1969 | Rigg | 176/65 X |
| 3,580,807 | 3/1971 | Kumpf | 176/65 X |
| 3,658,645 | 4/1972 | Hooper | 176/61 |
| 3,680,627 | 8/1972 | Linning | 176/78 X |
| 3,830,695 | 8/1974 | Sauvage | 176/65 X |
| 3,888,730 | 6/1975 | Jackson | 176/65 X |

FOREIGN PATENTS OR APPLICATIONS

| | | | |
|---|---|---|---|
| 2,133,410 | 1/1972 | Germany | 176/65 |
| 434,496 | 4/1967 | Switzerland | 176/65 |
| 1,126,350 | 11/1965 | United Kingdom | 176/65 |

*Primary Examiner*—Peter A. Nelson
*Attorney, Agent, or Firm*—Marvin A. Naigur; John E. Wilson

[57] ABSTRACT

An integral nuclear reactor having between the core and the reactor shell an annular passage in which is situated at least one bundle of tubes leading to and from an outlet and inlet header respectively to which they are butt welded. Heated fluid from the reactor core flows around the tubes causing a cross-flow heat exchange with the fluid in the tubes. Preferably some of the tubes in the upper region of the or each bundle near where they are welded to the headers are bent so that they lie in a higher plane than others in the bundle, thereby offering a greater welding area to the headers.

8 Claims, 9 Drawing Figures

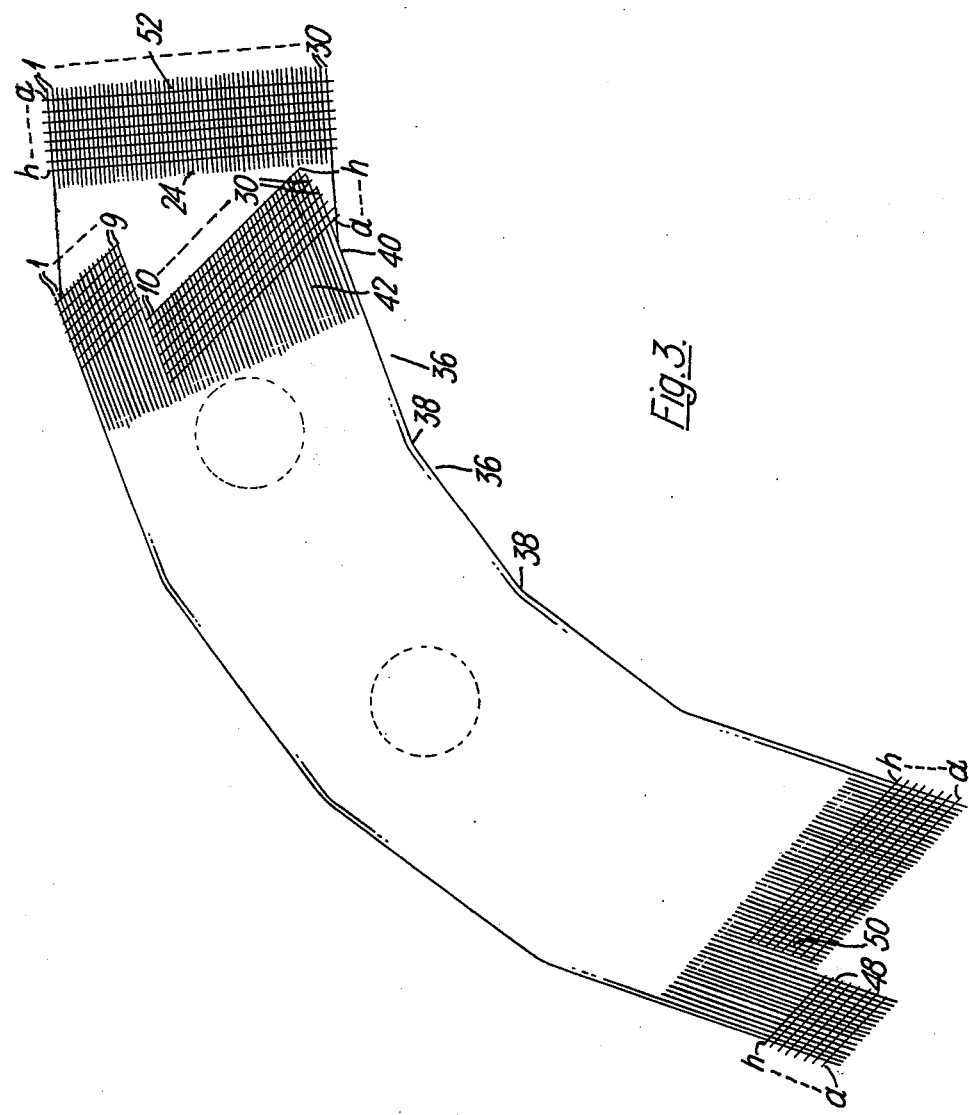

STEAM GENERATING PLANT

This invention relates to integral nuclear reactor steam generators and more particularly to the steam generating tube bundles contained therein.

BACKGROUND TO THE INVENTION

Integral nuclear reactor plants generally have an annular space between the central reactor core and the reactor shell. Positioned within this annular space are the steam generating tube bundles across which heating fluid from the reactor core is to be passed. Pumping apparatus is normally positioned below the annular space and reactor coolant fluid, after passing across the tube bundles, is arranged to be drawn into this apparatus.

Generally, a number of tube bundles, each occupying the same amount of space, are positioned in the annular space. Owing to the limited space available for the tube bundles it is difficult to locate a sufficient number of tubes in the annular passage and to make the tubes of sufficient length to allow production of superheated steam.

BRIEF SUMMARY OF INVENTION

According to the invention there is provided an integral nuclear reactor having an annular passage which is between the central reactor core and the reactor shell and which contains a steam generator comprising one or more serpentine tube bundles leading from an inlet header to an outlet header; a number of generally sector shaped substantially horizontal legs, formed from said tubes, extending at least part way around said annular passage, said legs being joined by tube bends to complete said serpentine tubes extending from said inlet header to said outlet header; certain of the tubes of the tube bundles extending in a generally circular direction further around the annular passage than other tubes of the tube bundle so that all the tubes of the tube bundle have substantially the same length, heated fluid from the reactor core being capable of flowing across the tubes in cross-flow indirect heat exchange relationship with fluid contained within the tubes.

The reactor of the invention has the advantage that a considerable number of steam generating tubes can be located within the annular passage, and that all the tubes can be made of sufficient length to allow the production in each tube of hot water, boiling water, saturated steam and superheated steam. All the tubes being substantially the same length ensure stable steam generating conditions. The heated coolant fluid from the reactor core is in cross-flow heat-exchange relationship with the fluid contained within the legs and this provides efficient heat exchange.

The inlet and outlet headers are preferably both positioned at the upper end of the reactor to facilitate access to the insides of the headers. When the headers are so positioned it is necessary to have a return length of tubing extending from the lower end of the serpentine tube bundle to the outlet or inlet header depending upon to which header the upper end of the bundle is attached. Usually the upper end of the tube bundle is connected to the outlet header and the lower end, via the return length of tubing, to the inlet header.

The generator of the invention may contain a single serpentine tube bundle extending right the way round the annular passage. Preferably, however, the annular space contains a plurality of such tube bundles spaced around the annular passage. There may, for example, be four such tube bundles.

Each serpentine tube bundle may comprise a number of substantially horizontal tube banks on legs joined at the ends by tube bends. Preferably the tubes of the tube banks are bent or manipulated so as to form a number of long straight lengths of tube joined to one another by small radius bends. This avoids the difficulties usually involved in bending lengths of tube to form large radius bends, and yet at the same time allows the tube bundles to conform to the shape of the annular passage. The small radius bends may all have the same radius, irrespective of their position in the bundle, and thus the cost of manufacturing the tube bundles can be reduced.

The tubes of the tube bends joining the ends of the tube banks may be substantially vertical and are connected to the tubes of the tube banks by small radius bends all of which may have the same radius.

In order to facilitate the welding of the ends of the tubes of the tube bundles to the inlet and outlet headers the tubes are made to abut the headers radially of the headers. In order to facilitate still further the welding of the tubes to the headers, the tubes, just before they enter the headers, can be spread out vertically such that the cross-sectional area of the tube bundle at the ends of the tubes to be welded to the headers is greater than the cross-sectional area of the tube bundle away from the end of the tubes.

The tubes are usually welded to the headers by an internal tube welding method, and thus the minimum spacing of the tubes on the outside of the headers is governed by the allowable distance between the bores containing adjacent tubes on the inside of the headers. By spreading the tubes out vertically the tubes can be spaced to meet the requirements.

Rather than hang the tube bundles from the headers, which would impose undesirable strains on the headers and on the header mountings, each tube bundle is supported by a frame, comprising a plurality of corrugated members extending between tubes of the tube bundles and connected to upright members alongside the tube bundles. These upright members can be attached to sheet metal ducting defining the path for the hot fluids from the reactor core through the tube bundles. Preferably each tube bundles is isolated from an adjacent tube bundle so that, should a tube bundle fail, the remaining tube bundles can continue to be operated.

As will be appreciated, if a tube bundle were to have its upright side edges in planes lying on radii of the reactor, the radially outer-most tubes would have a greater length than the radially innermost tubes. This would be undesirable as unstable steam generating conditions would result. This problem is avoided, according to the invention, by making the tubes of the tube bundles of substantially the same length, and this is achieved by extending certain of the tubes in a circular direction further around the annular passage than other tubes. For example, a tube may be extended in a circular direction further around the annular passage than an adjacent radially outer tube, and this extension will compensate for the increased length resulting from its radially outer position.

Sometimes it may be necessary to reduce the height of a part of the tube bundle to allow the bundle to conform to the shape of the annular passage, and this will mean that the part of the tube bundle of reduced height will contain tubes of substantially shorter length than those in the remaining part of the bundle. This problem can be overcome by extending the tubes in the part of the tube bundle of reduced height in a circular direction around the annular passage so as to compensate for the reduced length of those tubes.

BRIEF DESCRIPTION OF DRAWINGS

The invention will now be illustrated with reference to the accompanying drawings, in which:

FIG. 3 is a diagrammatic section of a tube bundle taken along the line A—A of FIG. 2;

DESCRIPTION OF PREFERRED EMBODIMENT

Figure 1:
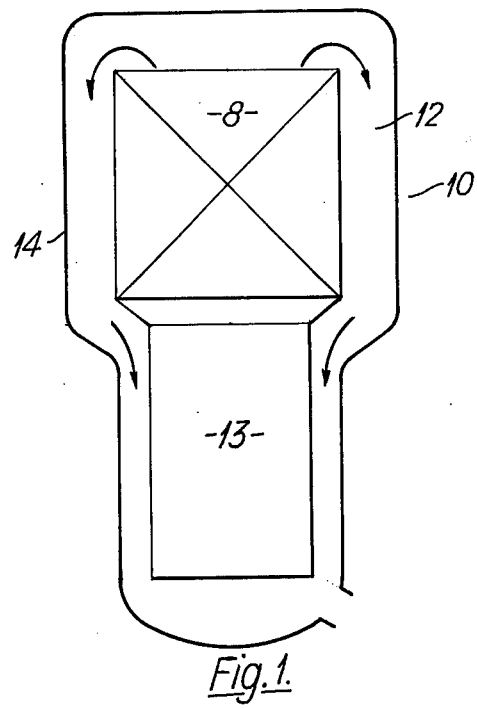
FIG. 1 is a diagrammatic side view of an integral nuclear reaction plant.

The nuclear reactor steam generator 10 shown in the drawings comprises a central reactor core 8 and an annular passage 12 between the core and the reactor shell 14. A pumping apparatus 13 positioned beneath the core and annular passage draws off coolant fluid through the annular passage.

Figure 2:
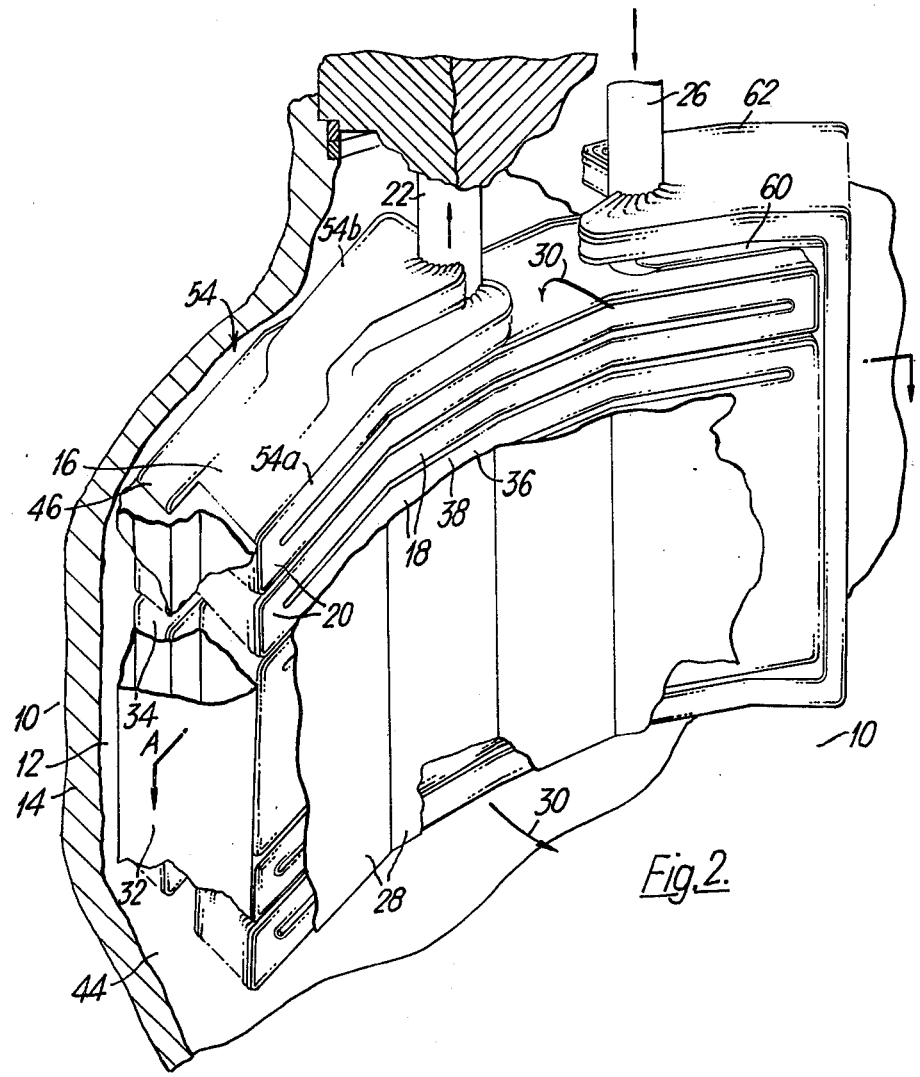
FIG. 2 is a perspective cut-away view of a nuclear reactor steam generator of the invention with the reactor core and three of the four tube bundles removed.

A single upright serpentine tube bundle 16 is shown in FIG. 2 and four such bundles are spaced around the annular passage 12.

The serpentine tube bundle 16 is composed of horizontal banks 18 joined at their ends by bends 20. The upper end of the tube bundle 16 is connected to an outlet header 22 and the lower end, via a return length of tubing 24, to the inlet header 26.

The tube bundle 16 is supported by horizontal, corrugated members (not shown), themselves attached to a metal plate 28 which define the duct through the tube bundle for the hot coolant fluid from the reactor core. This hot fluid passes down in cross-flow indirect heat-exchange relationship with the fluids contained within the tubes, through the bundle, as indicated by the arrows 30, and are drawn into pumping apparatus (not shown) below the annular space.

Each tube bundle 16 is separated from adjacent tube bundles by a sheet metal spacing member 32, made to conform to the shape of the vertical edge 34 of the tube bundle. Each tube bundle is thus separated from adjacent bundles and, should a tube bundle fail, that bundle can be closed off an operation of the generator continued with the remaining bundles.

Figure 4:
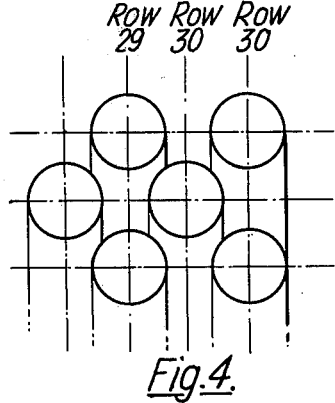
FIG. 4 is a diagrammatic section through a tube bank, showing how the tubes are pitched.

The tube bundle 16 is made to conform to the shape of the annular passage and this is achieved by bending or manipulating the tubes so as to form a number of long straight lengths of tube 36 joined at their ends by short lengths of small-radius tube 38. In this way all the tubes can be kept parallel and, so the tubes can be closely pitched, the pitch arrangement shown in FIG. 4 is chosen.

The radially innermost tubes of the tube bank are made to extend in a circular direction further around the annular passage than the radially outermost tubes, and in this way all the tubes can be made of generally the same length. For example, the tube 40 in FIG. 3 extends past the tube 42 in a circular direction around the annular space 12 by an amount $x$, and the tubes 40 and 42 will thus be of generally the same length.

As will be clearly seen in FIG. 2 the lower part 44 of annular space 12 is of reduced radial width, and it is thus not possible for the radially outermost part 46 of the tube bundle to extend down as far as the lower end of remaining part of the bundle. That part 46 is in fact provided with two fewer horizontal banks, and to compensate for the reduced length of the tubes in that part the tubes are extended in a circular direction around the annular space. A tube 48, which is the part 46 of reduced height, thus extends in a circular direction further around the annular space than a tube 50 which is not in that part. Again, the radially innermost tubes of the part 46 extends in a circular direction further around the annular space than the radially outermost tubes.

In the drawings each tube bank 18 contains eight horizontal rows of tubes, marked $a$ to $h$, and 30 vertical rows, each vertical row containing two vertical sets of tubes, as shown in FIG. 3, and marked 1 to 30. The numbers of the tubes in these rows can naturally be varied according to the sizes of the annular passage and the heat-exchange surface area required.

Figure 5:
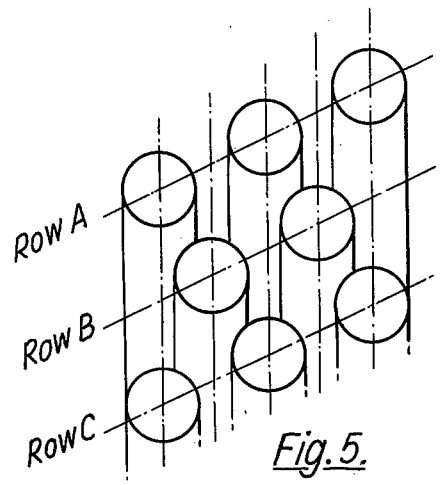
FIG. 5 is a diagrammatic section through a tube bend showing how the tubes are pitched.

Each of the tubes in the horizontal tube banks 18 is joined to a vertical tube in the bends 20 by a short length of curved tube. The pitch arrangement of the tubes in the bends 20 is shown in FIG. 5, and by using this arrangement sufficient spacing between adjacent tubes can be maintained to allow heating fluid to pass between them.

As will be seen in FIG. 3 the vertical part 52 of the length of return tubing 24 is generally in a radial plane of the reactor. The radially outermost tubes will thus be slightly longer than the radially innermost tubes but any difference in the lengths of the tubes which this may produce is negligible and can be ignored since very little heat-exchange occurs in this region of the tube bundle.

Figure 6:
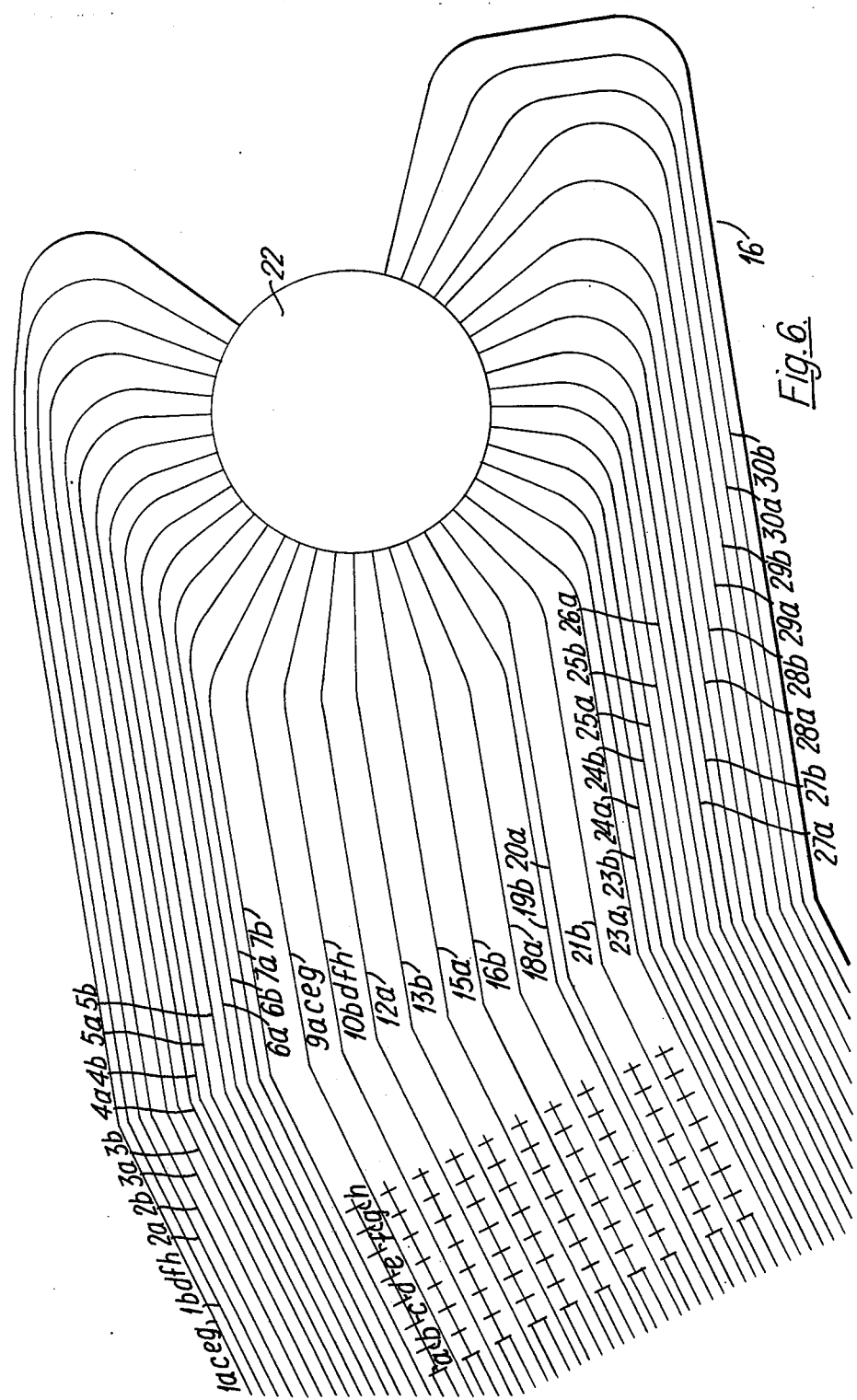
FIG. 6 is a partly diagrammatic plan view showing how the tubes are connected to an outlet header.
Figure 7:
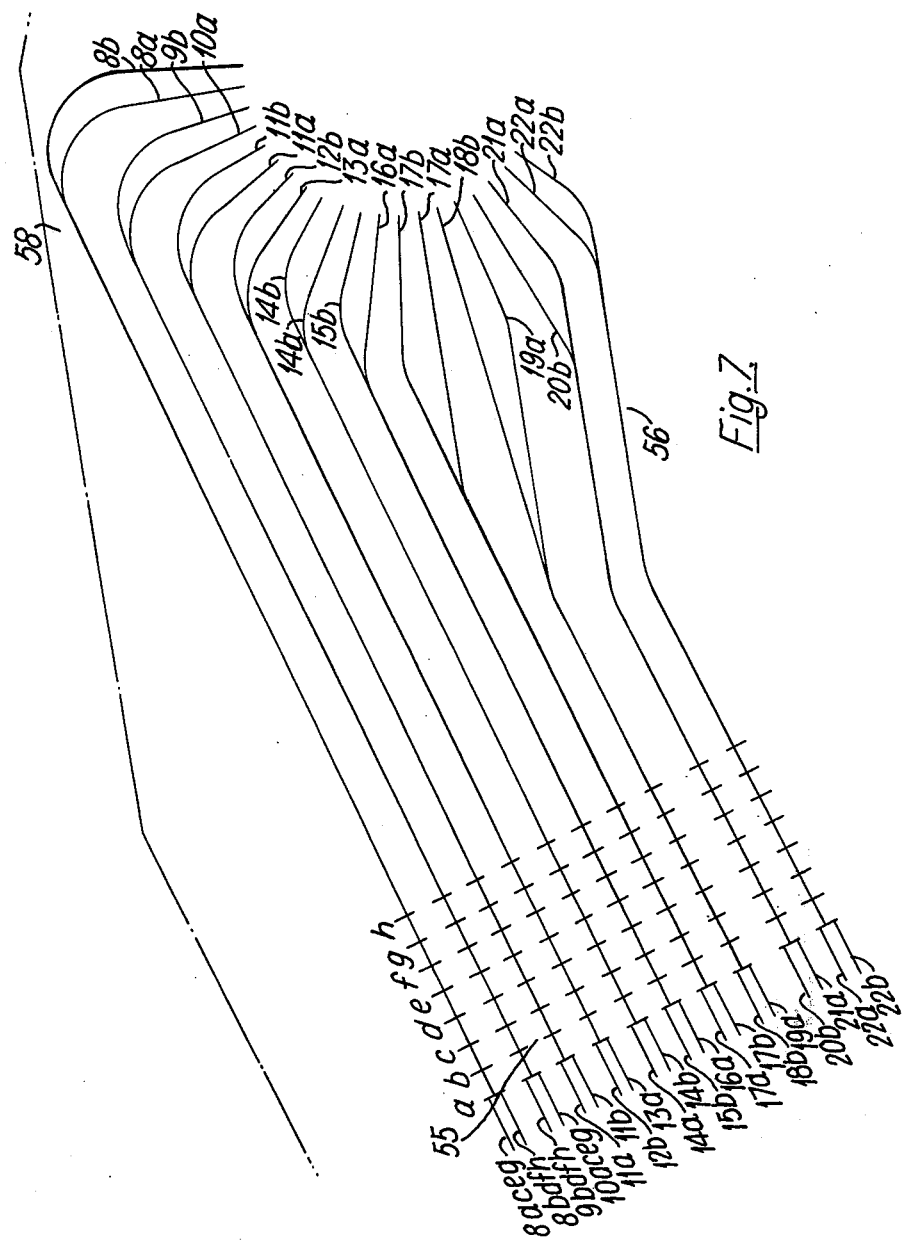
FIG. 7 is a partly diagrammatic plan view further illustrating how the tubes are connected to an outlet header.

The tubes of the tube bundles are connected to the outlet header 22 radially of the header. This is shown in FIGS. 6 and 7. The tubes of the top tube bank 54 are spaced slightly further apart than those of the lower tube banks, and the tubes are spread out vertically into two banks, a lower bank 54$a$ and an upper bank 54$b$. The spread-out tubes are thus easier to weld to the header. The pitching of the tubes in all the tube banks should be as close as possible.

Welding is usually performed with an internal bore welding torch. The welding torch may be carried on a detachable, rotatable boom co-axial with the header, and thus the tube penetrations through the header must be radial. The minimum allowable distance between the bores on the inside of the headers thus dictates the spacing of the tubes on the outside of the headers.

As shown in FIG. 6 all the tubes in the vertical rows 1 to 7 and 23 to 30 of the top bank 54 extend directly to the outlet header, and the tubes are welded to the header radially of the header and spread out round the header to facilitate welding. Certain of the tubes in the vertical rows 8 to 22 likewise extend directly to the outlet header. However, certain of the other tubes in the vertical rows 8 to 22 pass through a bend 55 into a higher bank 54b and thus the tubes 8b, 8d, 8f and 8h pass into a vertical plane of tubes in the bend 55 and, after being bent back into a horizontal plane, continue in this plane to a point 58 near the outlet header. The tubes here are divided into two vertical planes, one containing the tubes 8a, 8c, 8e and 8g and the other tubes 8b, 8d, 8f and 8h before they join the outlet header.

The tubes of the return length of tubing 24 are connected to the inlet header 26. These tubes are divided into a lower horizontal bank 60 and an upper horizontal bank 62 near the header 26. The tubes are thus spread out vertically and the desired spacing of the tubes can be chosen.

Figure 8:
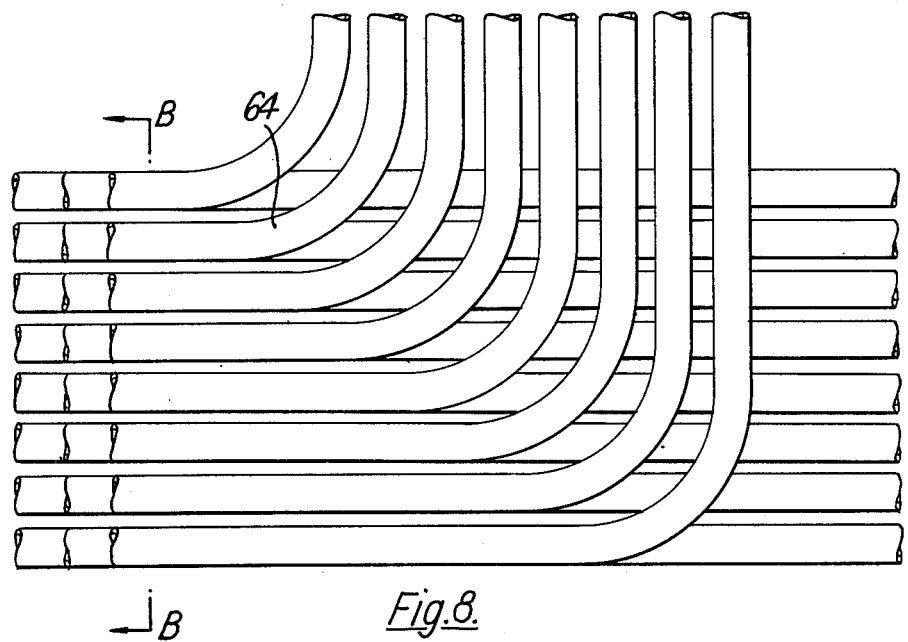
FIG. 8 is a side view of the tube bundle showing how the tubes are led to the inlet header.
Figure 9:
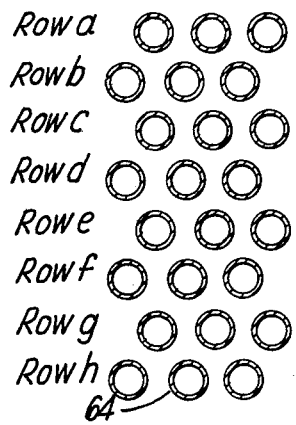
FIG. 9 is a section taken on the line B—B of FIG. 8.

FIGS. 8 and 9 show how the tubes are divided. Alternate tubes in each of the rows a to h are bent at 64, all the bends having constant radii and pass into the lower horizontal bank 60. The remaining tubes in the rows continue in a straight line and are bent into the upper horizontal bank 62.

The tubes at the bends 64 are displaced slightly sideways as shown in FIG. 9 so that passing into the lower bank 62 do not abut tubes passing to the upper bank 60.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What we claim is:
1. An integral nuclear reactor comprising:
a. an upright cylindrical shell;
b. a central nuclear reactor core within said shell and defining with said shell an upright annular passage therebetween;
c. means for circulating heated primary fluid from said core through said passage and back to said core;
d. a bundle of serpentine tubes of equal length positioned within said annular passage, such that some of said tubes are closer to said core than others of said tubes;
e. an inlet header extending through said shell and joined to said tubes for delivering vaporizable liquid to said tubes;
f. an outlet header extending through said shell and joined to said tubes for receiving vapor from said tubes;
g. said tubes each having a plurality of substantially horizontal legs extending at least part way around said annular passage, said legs being joined by tube bends to complete said serpentine tubes extending from said inlet header to said outlet header;
wherein the portion of the circumference of said annular passage traversed by the horizontal legs of said tubes that are closer to said core is greater than the portion of said circumference traversed by the horizontal legs of said tubes that are further from said core so that the total length of each tube is substantially the same, and wherein the vaporizable liquid is heated in said tubes by indirect heat exchange with said heated primary fluid circulating substantially orthogonal to horizontal legs.

2. A reactor according to claim 1 in which said inlet and outlet headers are positioned at the upper end of said reactor.

3. A reactor according to claim 1 in which there are four tube bundles in said annular passage.

4. A reactor according to claim 1 in which the legs are in the form of a plurality of long straight lengths of tube joined to one another by small radius bends.

5. A reactor according to claim 1 in which the ends of the tubes leading to and from the outlet and inlet respectively abut the headers radially thereof.

6. A reactor according to claim 5 in which some of the tubes in the upper region of said bundle adjacent the location where they are joined to the headers are bent so that they lie in a higher plane than others in the bundle.

7. A reactor according to claim 1 further comprising a frame for supporting said bundle, said frame comprising a plurality of corrugated members nesting between said tubes and connected to upright members alongside the tube bundles.

8. An integral nuclear reactor comprising:
a. an upright cylindrical shell;
b. a central nuclear reactor core within said shell and defining with said shell an upright annular passage;
c. means for circulating heated primary fluid from said core through said passage and back to said core;
d. a bundle of serpentine tubes of equal length positioned within said annular passage such that some of said tubes are closer to said core than others of said tubes;
e. an inlet header, positioned in the upper region of said reactor, through said shell joined to said tubes for delivering vaporizable liquid to said tubes;
f. an outlet header, positioned in the upper region of said reactor, through said shell joined to said tubes for receiving vapor from said tubes;
g. a frame for supporting said bundle of tubes, said frame comprising a plurality of corrugated members nesting between said tubes, and connected to upright members alongside the tube bundles;
h. said tubes each having a plurality of substantially horizontal legs, each leg comprising a plurality of long straight lengths of tube joined to one another by small radius tube bends, said legs extending at least part way around said annular passage, said legs being joined to one another by tube bends to complete said serpentine tubes extending from said inlet to said outlet header;
i. wherein the portion of the circumference of said annular passage traversed by the horizontal legs of said tubes that are closer to said core is greater than the portion of the circumference traversed by the horizontal legs that are further from said core so that the total tube length of each tube is substantially the same; the ends of said tube joined to said inlet and outlet headers abut the headers radially thereof; the tubes in the upper region of said bundle near where they are joined to the headers are bent so that they lie in a higher plane than others in the bundle; and wherein the vaporizable liquid is heated in said tubes by indirect heat exchange with said heated primary fluid circulating substantially orthogonal to said horizontal legs.

* * * * *